United States Patent
Stratton et al.

(10) Patent No.: US 9,759,281 B1
(45) Date of Patent: Sep. 12, 2017

(54) TONE RING ATTACHMENT METHOD

(71) Applicant: CONSOLIDATED METCO, INC., Vancouver, WA (US)

(72) Inventors: Andrew James Stratton, Vancouver, WA (US); Conor Liam Crowley, Vancouver, WA (US)

(73) Assignee: Consolidated Metco, Inc., Vancouver, WA (US)

( * ) Notice: Subject to any disclaimer, the term of this patent is extended or adjusted under 35 U.S.C. 154(b) by 0 days.

(21) Appl. No.: 15/065,417

(22) Filed: Mar. 9, 2016

(51) Int. Cl.
*F16D 65/12* (2006.01)
*F16D 66/00* (2006.01)

(52) U.S. Cl.
CPC ............. *F16D 66/00* (2013.01); *F16D 65/12* (2013.01); *F16D 2066/003* (2013.01)

(58) Field of Classification Search
CPC ...... F16D 65/12; F16D 65/123; F16D 65/121; F16D 2066/003; F16D 65/128; F16D 65/847
See application file for complete search history.

(56) References Cited

U.S. PATENT DOCUMENTS

| | | | |
|---|---|---|---|
| 3,949,841 A * | 4/1976 | Jovick | B60T 8/329 188/181 R |
| RE30,522 E | 2/1981 | Gee et al. | |
| 5,760,575 A | 6/1998 | Kumamoto et al. | |
| 6,619,440 B2 * | 9/2003 | Antony | B60T 1/065 188/17 |
| 6,945,367 B1 | 9/2005 | Yuhas | |
| 7,219,778 B2 | 5/2007 | Pete et al. | |
| 7,306,293 B2 | 12/2007 | Redgrave | |
| 7,487,862 B2 | 2/2009 | Carlson et al. | |
| 7,779,969 B2 | 8/2010 | Gonska | |
| 7,963,375 B2 | 6/2011 | Pahle | |
| 7,980,367 B2 * | 7/2011 | Hester | B60T 8/329 188/18 A |
| 7,997,391 B2 | 8/2011 | Burgoon et al. | |
| 8,584,815 B2 | 11/2013 | Hester | |
| 8,613,347 B2 | 12/2013 | Pahle | |
| 2009/0218183 A1 | 9/2009 | Burgoon et al. | |
| 2012/0247883 A1 * | 10/2012 | Root | B60B 27/0052 188/18 A |
| 2015/0021128 A1 * | 1/2015 | White | F16D 65/128 188/218 XL |

* cited by examiner

*Primary Examiner* — Anna Momper
*Assistant Examiner* — Mahbubur Rashid
(74) *Attorney, Agent, or Firm* — Edward J. Brosius

(57) ABSTRACT

An attachment method an assembly for an induction sensing tone ring is provided comprising a rotating part, the rotating part having a circular pocket. A spring is provided that is received in the rotating part circular pocket. A tone ring is received in the tone ring circular pocket on top of the spring. The rotating part has a plurality of retaining ledges, with each retaining ledge extending radially inward into the rotating part circular pocket from a wall of the rotating part forming the pocket. Each retaining ledge forms a retaining groove. The tone ring has a plurality of locating tab assemblies, each locating tab assembly being received in one of the retaining grooves of the brake rotor circular pocket.

10 Claims, 3 Drawing Sheets

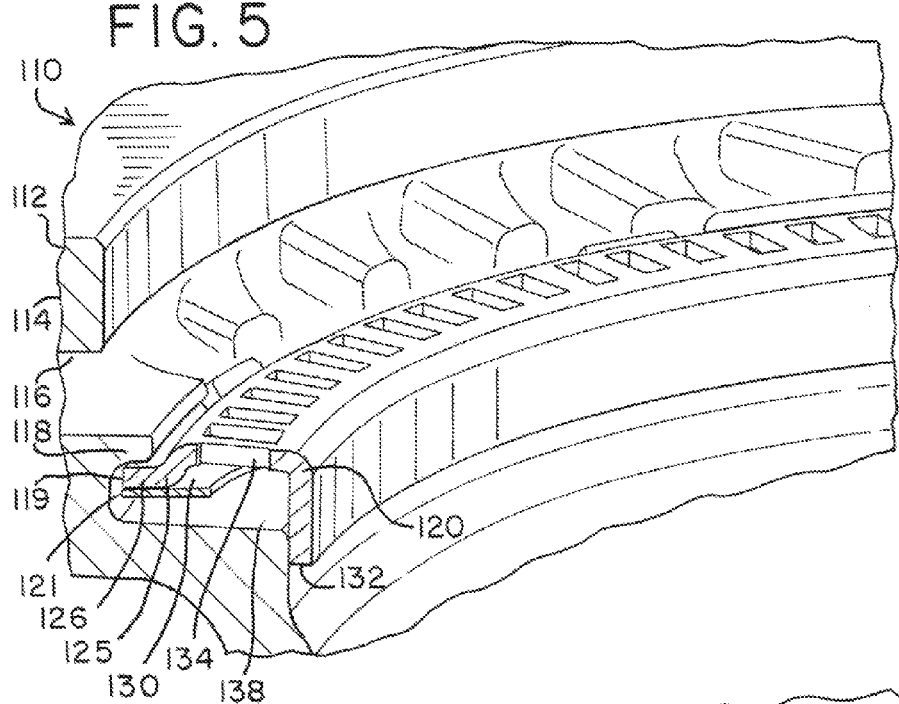
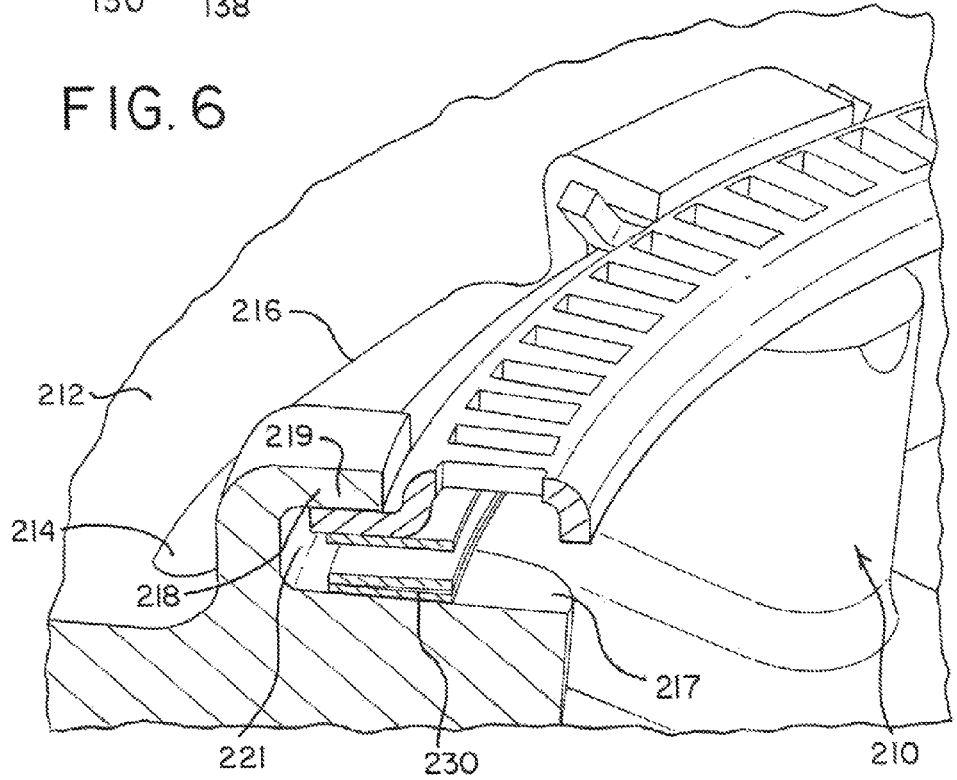

TONE RING ATTACHMENT METHOD

BACKGROUND OF THE INVENTION

The present application relates to a method and an assembly including an inductive tone ring attached to a rotating part for speed and position sensing purposes.

The use of inductive tone rings for positional sensing, as in anti-lock brake applications, is known. However, the installation of the anti-lock brake system sensing ring, particularly to a disc brake rotor, has caused concern. Such concerns include difficult installation and replacement, the use of bolts and screws which can loosen or fail, and thermal transfer from the brake rotor to the tone ring causing dissimilar thermal expansion and warpage. Corrosion of the tone ring or tone ring features formed into the brake rotor is also a major cause of field issues. Often the tone ring will corrode beyond a usable condition prior to the wear limit of the rotor being met.

Accordingly, an improved fixturing method for an inductive tone ring is provided.

SUMMARY OF THE INVENTION

An improved method for attaching an inductive tone ring to a rotating part, which in the current manifestation is a brake rotor but could also be applied to a wheel hub, machine spindle or other rotating part in which rotational position or speed measurement is required.

The method as applied to a disc brake assembly comprises a brake rotor having an internal wall forming a circular pocket. A spring is located in the circular pocket. An anti-lock brake tone ring is received in the circular pocket adjacent the spring. The brake rotor includes a plurality of retaining ledges formed in the internal wall of the brake rotor forming the circular pocket. Each retaining ledge has a main section with two ends and an upper lip that forms a retaining groove.

The tone ring has a plurality of locating tab assemblies. Each locating tab assembly has a leading locking tab, a center axial locating section and a stopping radial locating tab. Each locating tab assembly of the tone ring is received in one of the retaining grooves of the brake rotor.

The advantages of the improved tone ring attachment method of the present invention include reduced area of contact between the brake rotor and the tone ring resulting in a reduction of thermal transfer from the brake rotor to the tone ring. The ring is not rigidly constrained, allowing it to "float" within the rotor attachment to avoid the warping at high temperatures that can occur if the ring is rigidly mounted to the rotor with screws or bolts. Corrosion effects are reduced as a result of the lower temperatures and minimal contact between the tone ring and the rotor. The elimination of screws, bolts or press-fits in the attachment of the tone ring to the brake rotor eases installation and replacement. Further, no drilling or tapping of screw or bolt holes in the rotor is required in order to prepare the rotor to receive the tone ring. The tone ring of the present invention is simply rotated into its secured position in the circular pocket of the brake rotor.

BRIEF DESCRIPTION OF THE DRAWINGS

In the drawings,

FIG. 5 is a detailed partial view of a brake rotor and tone ring in accordance with a second embodiment of the present invention, and FIG. 6 is a detailed partial view of a brake rotor and tone ring in accordance with a third embodiment of the present invention.

DETAILED DESCRIPTION OF THE DRAWINGS

Figure 1:
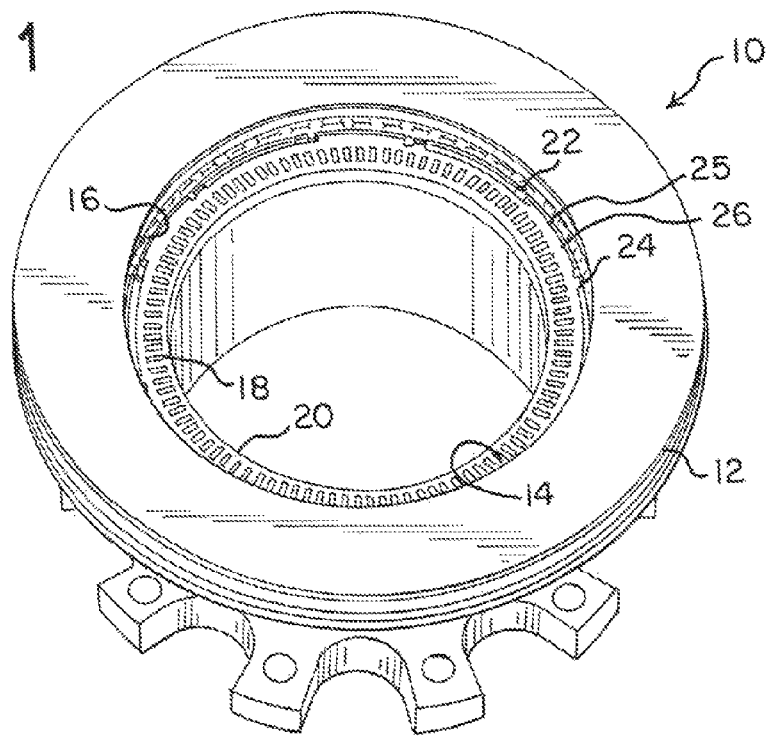
FIG. 1 is a perspective view of an assembled brake rotor and tone ring and spring in accordance with a first embodiment of the present invention.
Figure 2:
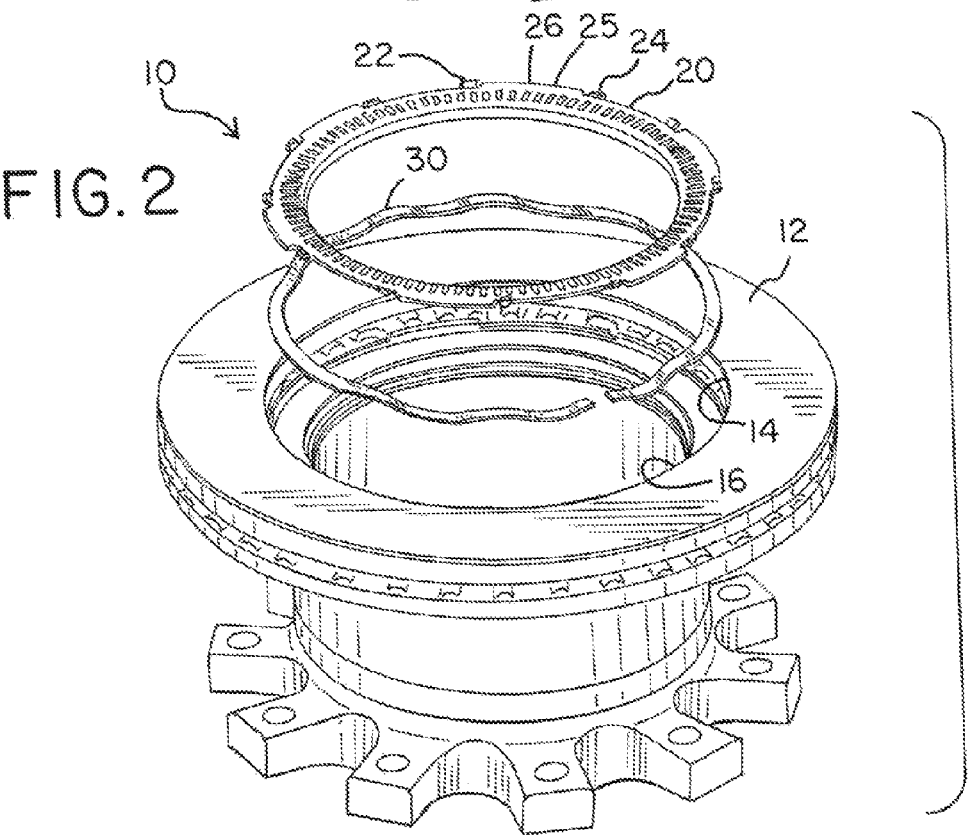
FIG. 2 is a perspective view of a brake rotor and tone ring and spring in accordance with a first embodiment of the present invention with the components separated.

Referring now to FIGS. 1-2, a disc brake assembly in accordance with a first embodiment of the present invention is shown generally at 10. A circular shaped brake rotor is shown at 12, with the usual material for brake rotor 12 being cast iron. Brake rotor 12 includes internal wall 14 which forms circular pocket 16. Spring 30 is received in circular pocket 16. Spring 30 is a circular shaped spring.

Tone ring 20 is placed adjacent or actually on top of spring 30 in circular pocket 16. Tone ring 20 is comprised of steel or other ferromagnetic materials that are known for use in such inductive tone rings. Upon installation, tone ring 20 compresses spring 30.

Brake rotor 12 further includes a plurality of retaining ledges 18 formed in internal wall 14 around circular pocket 16. Each retaining ledge 18 includes an upper lip 19 that extends radially inward into circular pocket 16. Each upper lip 19 forms retaining groove 21 thereunder.

Figure 3:
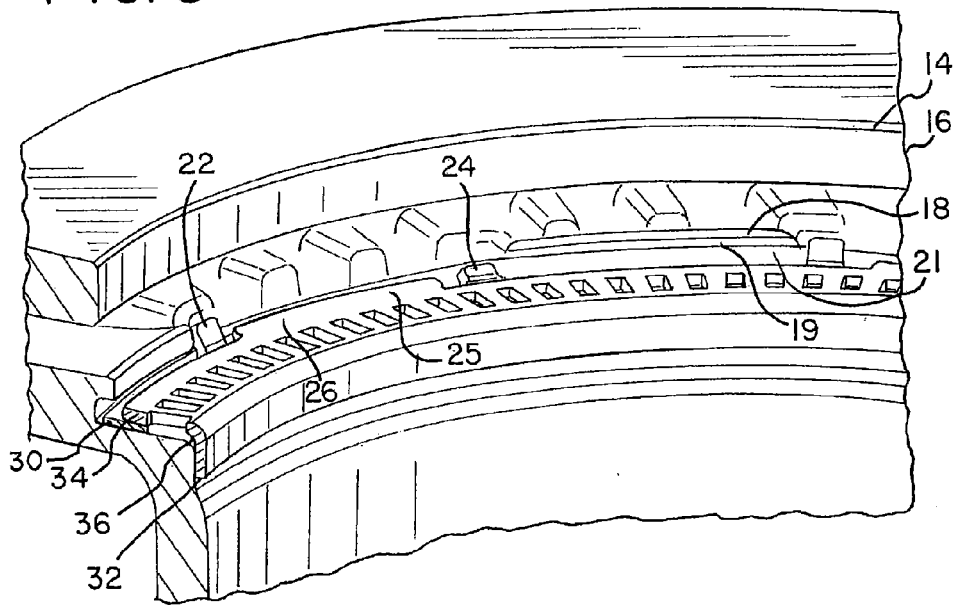
FIG. 3 is a detailed partial view of a brake rotor and tone ring in an unlocked position in accordance with a first embodiment of the present invention.
Figure 4:
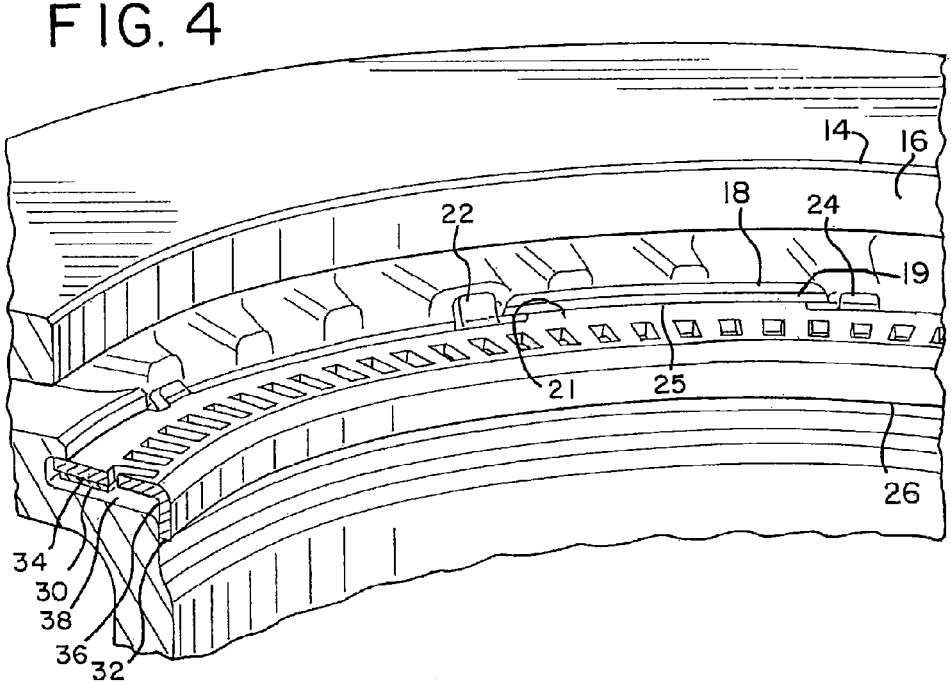
FIG. 4 is a detailed partial view of a brake rotor and tone ring in a locked position in accordance with a first embodiment of the present invention.

Referring now to FIGS. 3 and 4 as well, tone ring 20 is seen to include inner lip 32 and upper surface 34. Inner lip 32 of tone ring 20 is fit adjacent a second internal wall 36 of brake rotor 12 to center the tone ring 20 about the rotating axis. A plurality of locating tab assemblies 25 extend from upper surface 34 of tone ring 20. Each locating tab assembly 25 includes center section 26, an adjacent leading locking tab 24 and an adjacent stopping locking tab 22.

Upon assembly of disc brake assembly 10, spring 30 is placed in circular pocket 16 of brake rotor 12 to rest adjacent ridge 38 of brake rotor 12. Tone ring 20 is then placed adjacent or actually on top of spring 30. Upon compression of spring 30 by a force readily administered by a workman or automation to tone ring 20, tone ring 20 is then rotated clockwise such that leading locking tab 24 passes through retaining groove 21 in brake rotor 12. Leading locking tab 24 is of a height designed to allow such passage. Center section 26 of tone ring 20 also passes through retaining groove 21. Stopping locking tab 22 is stopped by contacting an edge of retaining ledge 18, usually with such contact being against upper lip 19 of retaining ledge 18. The compressive force is released and the ring 20 is located axially by the center locating section 26 contacting and resting on retaining ledge 18.

Referring now to FIG. 5, a disc brake assembly in accordance with a second embodiment of the present invention is shown generally at 110. A circular shaped brake rotor is shown at 112, with the usual material for brake rotor 112 being cast iron, but other metals such as steel or ferrous alloys could be used as well. Brake rotor 112 includes internal wall 114 which forms circular pocket 116. Spring 130 is received in circular pocket 116. In this present manifestation, spring 130 is a circular shaped spring with a series of flat coils spaced from each other. Spring 130 could also be in the shape of a coil or comprise another linear force creating device such as a conical spring washer (or Belleville washer), elastomer, or array of multiple springs.

Tone ring 120 is placed adjacent or actually on top of spring 130 in circular pocket 116. Tone ring 120 is comprised of steel or other alloys that are known for use in such tone rings. Upon installation, tone ring 120 compresses spring 130, but in usual installation, it is desirable to keep certain amount of gap between the flat coils of spring 130.

Brake rotor 112 further includes a plurality of retaining ledges 118 formed in internal wall 114 around circular pocket 116. Each retaining ledge 118 includes an upper lip 119 that extends radially inward into circular pocket 116. Each upper lip 119 forms retaining groove 121 thereunder.

Tone ring 120 seen to include inner lip 132 and upper surface 134. Inner lip 132 of tone ring 120 is fit adjacent a second internal wall 136 of brake rotor 112. A plurality of locating tab assemblies 125 extend at a downward angle from upper surface 134 of tone ring 120. Each locating tab assembly 125 includes center section 126, an adjacent leading locking tab 124 and an adjacent stopping locking tab 122.

Upon assembly of disc brake assembly 110, wave spring 130 is placed in circular pocket 116 of brake rotor 112 to rest adjacent ridge 138 of brake rotor 112, which ridge 138 is normal to second internal wall 136 of brake rotor 112. Tone ring 120 is then placed adjacent or actually on top of wave spring 130. Upon compression of wave spring 130 by a force readily administered by a workman, tone ring 120 is then rotated clockwise such that leading locking tab 124 passes through retaining groove 121 in brake rotor 112. Leading locking tab 124 is of a height designed to allow such passage. Center section 126 of tone ring 120 also passes through retaining groove 121. However, stopping locking tab 122 is of a height designed to not allow its passage into retaining groove 121, and thus the locking rotation installation of tone ring 120 is readily accomplished. Stopping locking tab 122 is stopped by contacting an edge of retaining ledge 118, usually with such contact being against upper lip 119 of retaining ledge 118.

Referring now to FIG. 6, a disc brake assembly in accordance with a third embodiment of the present invention is shown generally at 210. A circular shaped brake rotor is shown at 212, with the usual material for brake rotor 212 being cast iron, but other metals such as steel or ferrous alloys could be used as well. Brake rotor 212 includes internal wall 214 which includes a plurality of pedestals 217 which form circular pocket 216. Wave spring 230 is received on top of each pedestal 217 in circular pocket 216. As such, wave spring 230 has additional coils to allow proper support for tone ring 220. Wave spring 230 is a circular shaped spring with a series of flat 120 coils spaced from each other.

Tone ring 220 is placed adjacent or actually on top of wave spring 230 in circular pocket 216. Tone ring 220 is comprised of steel or other alloys that are known for use in such tone rings. Upon installation, tone ring 220 compresses wave spring 230, but in usual installation, it is desirable to keep certain amount of gap between the flat coils of wave spring 230.

Brake rotor 212 further includes a plurality of retaining ledges 218 formed in pedestals 217 around circular pocket 216. Each retaining ledge 218 includes an upper lip 219 that extends radially inward into circular pocket 216. Each upper lip 219 forms retaining groove 221 thereunder.

Tone ring 220 seen to include inner lip 232 and upper surface 234. Inner lip 232 of tone ring 220 is fit adjacent a second internal wall 236 of brake rotor 212. A plurality of locating tab assemblies 225 extend at a downward angle from upper surface 234 of tone ring 220. Each locating tab assembly 225 includes center section 226, an adjacent leading locking tab 224 and an adjacent stopping locking tab 222.

Upon assembly of disc brake assembly 210, wave spring 230 is placed in circular pocket 216 of brake rotor 212 to rest adjacent ridge 238 of brake rotor 212, which ridge 238 is normal to second internal wall 236 of brake rotor 212. Tone ring 220 is then placed adjacent or actually on top of wave spring 230. Upon compression of wave spring 230 by a force readily administered by a workman, tone ring 220 is then rotated clockwise such that leading locking tab 224 passes through retaining groove 221 in brake rotor 212. Leading locking tab 224 is of a height designed to allow such passage. Center section 226 of tone ring 220 also passes through retaining groove 221. However, stopping locking tab 222 is of a height designed to not allow its passage into retaining groove 221, and thus the locking rotation installation of tone ring 220 is readily accomplished. Stopping locking tab 122 is stopped by contacting an edge of retaining ledge 118, usually with such contact being against upper lip 119 of retaining ledge 118.

What is claimed is:

1. A disc brake assembly comprising:
   a brake rotor,
   the brake rotor having a circular pocket,
   a wave spring received in the brake rotor circular pocket,
   an anti-lock brake sensing ring received in the brake rotor circular pocket on top of the wave spring,
   the brake rotor having a plurality of retaining ledges, each retaining ledge extending radially inward into the brake rotor circular pocket from a wall of the brake rotor forming the pocket,
   each retaining ledge having a main section with two ends and an upper lip that forms a retaining groove,
   the anti-lock brake sensing ring having a plurality of locating tab assemblies, each locating tab assembly having a leading locking tab, a center section, and a stopping locking tab,
   each locating tab assembly of the anti-lock brake sensing ring being received in one of the retaining grooves of the brake rotor, wherein each anti-lock brake sensing ring tab assembly center extended section extends downwardly and radially outward from an upper surface of the anti-lock brake sensing ring.

2. The disc brake assembly of claim 1,
   wherein each leading locking tab of the anti-lock brake sensing ring is positioned adjacent one end of one of the retaining ledges of the brake rotor circular pocket, and
   each stopping locking tab of one of the anti-lock brake sensing ring is positioned adjacent the other end of the retaining ledge of the brake rotor circular pocket.

3. The disc brake assembly of claim 1,
   wherein the brake rotor circular pocket is comprised of a plurality of pedestals,
   with the wave spring supported on each pedestal.

4. A disc brake assembly comprising:
   a brake rotor,
   the brake rotor having an internal wall forming a circular pocket,
   a wave spring received in the brake rotor circular pocket,
   an anti-lock brake sensing ring received in the brake rotor circular pocket adjacent the wave spring, the brake rotor having a plurality of retaining ledges, each retaining ledge formed in the internal wall of the brake rotor forming the circular pocket, each retaining ledge having a main section with two ends and an upper lip that forms a retaining groove, the anti-lock brake sensing ring having a plurality of locating tab assemblies, each locating tab assembly having a leading locking tab, a center section, and a stopping locking tab, each locating tab assembly of the anti-lock brake sensing ring being received in one of the retaining grooves of the brake rotor, wherein each anti-lock brake sensing ring tab assembly center extended section extends downwardly and radially outward from an upper surface of the anti-lock brake sensing ring.

5. The disc brake assembly of claim 4, wherein each leading locking tab of the anti-lock brake sensing ring is positioned adjacent one end of one of the retaining ledges of the brake rotor circular pocket, and each stopping locking tab of one of the anti-lock brake sensing ring is positioned adjacent the other end of the retaining ledge of the brake rotor circular pocket.

6. The disc brake assembly of claim 4, wherein the brake rotor circular pocket is comprised of a plurality of pedestals, with the wave spring supported on each pedestal.

7. A inductive tone ring attachment method comprising:

a rotating part, the rotating part having a circular pocket, a spring received in the rotating part's circular pocket, an inductive tone ring received in the rotating part's circular pocket on top of the spring, the rotating part having a plurality of retaining ledges, each retaining ledge extending radially inward into the rotating part's circular pocket from a wall of the rotating part forming the pocket, each retaining ledge having a main section with two ends and an upper lip that forms a retaining groove, tone ring having a plurality of locating tab assemblies, each locating tab assembly having a leading locking tab, a center section, and a stopping locking tab, each locating tab assembly of the tone ring being received in one of the retaining grooves of the rotating part, wherein each tone ring tab assembly center extended section extends downwardly and radially outward from an upper surface of the tone ring.

8. The rotating assembly of claim 7, wherein the tone ring retaining force is created by a elastomer spring.

9. The rotating assembly of claim 7, wherein each leading locking tab of the tone ring is positioned adjacent one end of one of the retaining ledges of the rotating part's circular pocket, and each stopping locking tab of one of the tone ring is positioned adjacent the other end of the retaining ledge of the rotating part's circular pocket.

10. The rotating part assembly of claim 7, wherein the rotating part's circular pocket is comprised of a plurality of pedestals, with the spring supported on each pedestal.

\* \* \* \* \*